United States Patent
Nauber et al.

(10) Patent No.: US 12,332,206 B2
(45) Date of Patent: Jun. 17, 2025

(54) ELECTROCHEMICAL MULTI-GAS SENSOR

(71) Applicant: Dräger Safety AG & Co. KGaA, Lübeck (DE)

(72) Inventors: Andreas Nauber, Lübeck (DE); Michael Sick, Lübeck (DE); Marie-Isabell Mattern-Frühwald, Lübeck (DE); Beate Ritz, Lübeck (DE)

(73) Assignee: DRÄGER SAFETY AG & CO. KGAA, Lübeck (DE)

( * ) Notice: Subject to any disclaimer, the term of this patent is extended or adjusted under 35 U.S.C. 154(b) by 445 days.

(21) Appl. No.: 17/487,493

(22) Filed: Sep. 28, 2021

(65) Prior Publication Data

US 2022/0099614 A1    Mar. 31, 2022

(30) Foreign Application Priority Data

Sep. 29, 2020 (DE) .................... 10 2020 125 411.3

(51) Int. Cl.
*G01N 27/27* (2006.01)
*G01N 27/413* (2006.01)

(52) U.S. Cl.
CPC .......... *G01N 27/27* (2013.01); *G01N 27/413* (2013.01)

(58) Field of Classification Search
CPC ..... G01N 27/27; G01N 27/413; G01N 27/404
See application file for complete search history.

(56) References Cited

U.S. PATENT DOCUMENTS

| | | | | |
|---|---|---|---|---|
| 6,666,963 B1 * | 12/2003 | Peng | .................... | G01N 27/404 204/415 |
| 7,651,597 B2 | 1/2010 | Saffell et al. | | |
| 10,302,627 B2 | 5/2019 | Scheffler et al. | | |
| 2003/0192781 A1 * | 10/2003 | Kiesele | ................ | G01N 33/005 204/431 |
| 2005/0145493 A1 * | 7/2005 | Saffell | .................. | G01N 33/004 204/431 |
| 2008/0128285 A1 * | 6/2008 | Moon | ................ | G01N 27/4045 204/192.1 |
| 2010/0057046 A1 * | 3/2010 | Stevens | ............. | A61M 16/0051 128/204.23 |

(Continued)

FOREIGN PATENT DOCUMENTS

| | | | | |
|---|---|---|---|---|
| CN | 103874922 A | | 6/2014 | |
| CN | 107941867 A * | | 4/2018 | ............. B01D 53/02 |

(Continued)

OTHER PUBLICATIONS

GmbH et al., English translation of DE102009054279A1, 2011 (Year: 2011).*

(Continued)

*Primary Examiner* — Luan V Van
*Assistant Examiner* — Shizhi Qian
(74) *Attorney, Agent, or Firm* — McGlew and Tuttle, P.C.

(57) ABSTRACT

A multi-gas sensor includes a defined arrangement of working electrodes and a reference electrode. The reference electrode has two conductively connected single electrodes formed of respective different electrode materials. The working electrode and the single electrodes are preferably each disk-shaped and are arranged in two stacks one on top of another. A process is provided for a quantitative or qualitative determination of two target gases with the multi-gas sensor.

22 Claims, 2 Drawing Sheets

(56) References Cited

U.S. PATENT DOCUMENTS

| | | | |
|---|---|---|---|
| 2017/0016847 A1 | 1/2017 | Saffell et al. | |
| 2017/0276634 A1* | 9/2017 | Saffell | G01N 27/40 |
| 2018/0017589 A1* | 1/2018 | Scheffler | G01N 33/497 |
| 2018/0080894 A1* | 3/2018 | Davis | G01N 27/3274 |
| 2019/0227025 A1* | 7/2019 | Ross | G01N 27/407 |

FOREIGN PATENT DOCUMENTS

| | | | | |
|---|---|---|---|---|
| CN | 207318406 U | 5/2018 | | |
| DE | 10330704 B3 | 12/2004 | | |
| DE | 102004059280 B4 | 8/2007 | | |
| DE | 102009054279 A1 * | 5/2011 | | G01N 27/4168 |
| DE | 102009010773 B4 | 7/2011 | | |
| DE | 102013007872 A1 * | 11/2014 | | G01N 27/40 |
| EP | 1600768 A1 * | 11/2005 | | G01N 27/4045 |
| EP | 2975390 A1 | 1/2016 | | |
| GB | 2308193 A | 6/1997 | | |
| KR | 2020097515 A * | 8/2020 | | |

OTHER PUBLICATIONS

Baltes et al., English translation of DE102013007872A1, 2014 (Year: 2014).*
Han et al., English translation of CN-107941867-A, 2018 (Year: 2018).*

* cited by examiner

ELECTROCHEMICAL MULTI-GAS SENSOR

CROSS REFERENCE TO RELATED APPLICATIONS

This application claims the benefit of priority under 35 U.S.C. § 119 of German Application 10 2020 125 411.3, filed Sep. 29, 2020, the entire contents of which are incorporated herein by reference.

TECHNICAL FIELD

The present invention pertains to a multi-gas sensor with at least two working electrodes and with at least one reference electrode, wherein the reference electrode has two single electrodes made of respective different electrode materials, which single electrodes are connected conductively, and the working electrode and the single electrodes are each preferably disk-shaped and are arranged in stacks one on top of another. The present invention further comprises a process for the quantitative or qualitative determination of at least two target gases with the multi-gas sensor.

TECHNICAL BACKGROUND

Electrochemical gas sensors are used in many different ways in analytical qualitative and quantitative gas measurement. A reaction of the target gas, which can be used for obtaining qualitative and quantitative data by means of unambiguously measurable electrical variables on the basis of their selectivity and their accessibility, takes place at a measuring electrode reacting selectively with the gas to be detected. Usual electrochemical gas sensors have a plurality of electrodes, which communicate with one another via an electrolyte. In a minimal configuration, an electrochemical gas sensor has a measuring electrode and a counterelectrode. In an expanded version, often called a three-electrode sensor, a reference electrode is added to this configuration. The electrodes are enclosed by an electrolyte.

Electrochemical multi-gas sensors are intended for detecting simultaneously at least two different target gases. These are frequently configured for this purpose with different electrode materials for measuring the at least two target gases. For example, the $H_2S$ working electrode in an $H_2S$/carbon monoxide sensor may thus consist of iridium and the carbon monoxide working electrode may consist of platinum. However, only one reference is used, as a rule, for the two different working electrodes.

The electrochemically active material of the reference electrode consists in this case, as a rule, either of iridium or of platinum or of a mixture of iridium and platinum, in which case the two metals are applied simultaneously to the surface of the reference electrode. If the reference electrode comprises iridium and platinum at the same time, a mixed potential will then develop.

An example of commercially available multi-gas sensors is mentioned, e.g., in DE 102004059280 B, which makes possible the simultaneous measurement of two toxic gases, namely, CO and $H_2S$, by means of multi-gas sensors in a very compact configuration in handy, portable devices. Another multi-gas sensor and its electrode array is disclosed in DE 102009010773 B3. In this case the reference electrodes are each connected in a non-conductive manner.

It is known that interfering gases may adversely affect the performance of the sensor. For example, the potential of the platinum reference electrode is affected especially strongly in the presence of ethanol. The potential is shifted into the negative range and comes into the range of the oxygen reduction, i.e., the sensor indicates a negative value in the presence of atmospheric oxygen. This is not desirable in an area in which the sensor shall detect the target gases.

The ambient air is regularly enriched with ethanol or other alcohols, such as isopropyl alcohol in environments in which disinfectants are frequently used. The reference electrode potential is affected in case of the use of alcohol-containing disinfectants, even though no target gas is present. This is especially true of platinum and platinum-carbon electrodes.

It may happen with the use of a mixed-metal reference electrode consisting of platinum and iridium for both target gases when ethanol is introduced that the ethanol as an interfering gas flows by the non-reactive working electrode, e.g., iridium, which does not react with alcohols either electrochemically or catalytically. Unhindered, the ethanol reaches the reference electrode, which contains a certain percentage of platinum, at which the ethanol can react. The reaction then leads to a potential shift, which distorts the measured value and may also bring about a change in the sensor performance in the longer run.

The second technical problem is that transient signals may occur in case of sudden temperature changes, because the electrode materials have different temperature coefficients, because if the working electrode and the reference electrode consist of different materials, the capacitive charge reversal currents, which are brought about by temperature changes, are not compensated. The transient signals are formed as a result.

This effect occurs especially in the case of very small or planar sensors with short distances between the components and small electrodes, because a temperature change in the environment can rapidly pass over to the reference electrode, because this is in this case shielded less from temperature effects. In case of small electrodes and short distances in the electrochemical system between the membranes and the electrodes, a temperature change can thus occur at the reference electrode in a short time. This is manifested in an undesired signal effect. This effect counteracts the endeavor to miniaturize sensors.

SUMMARY

An object of the present invention is to provide a measurement process and a measuring device, which reliably detects at least two different target gases in the presence of interfering gases and minimizes the influence of interfering gases, especially the influence of zero signals. Furthermore, it is desirable that the sensor have the lowest possible transient display in case of an abrupt temperature change, e.g., a temperature change exceeding 20° K per minute.

These and other objects are accomplished with the multi-gas sensor according to the present invention. Preferred embodiments are described below.

The multi-gas sensor according to the present invention comprises:
- a housing comprising a gas inlet (at least one gas inlet), preferably with a first gas inlet and with a second gas inlet,
- a first working electrode consisting of a first electrode material,
- a second working electrode consisting of a second electrode material, wherein the second electrode material is different from the first electrode material,
- at least one reference electrode, wherein the at least one reference electrode has a first single electrode consisting of the first electrode material and, separated therefrom, a second single electrode consisting of the second electrode material, and the two single electrodes are connected to one another in an electrically conductive manner, and an electrolyte in the interior of the housing, wherein the electrolyte is in contact with the first electrode material of the first working electrode, with the second electrode material of the second working electrode and with the electrode materials of the two single electrodes of the reference electrode, wherein the first working electrode is arranged between the at least one gas inlet, especially the first gas inlet, and the first single electrode of the reference electrode.

At least one gas inlet is preferably provided per working electrode. The first gas inlet and the second gas inlet, if present, are connected in parallel. Furthermore, a counterelectrode is present. The second working electrode is preferably also arranged between the first gas inlet or, if present, the second gas inlet and the second single electrode of the reference electrode.

The present invention comprises, furthermore, a process for the quantitative or qualitative determination of at least two target gases with the multi-gas sensor, wherein the measurement is preferably carried out amperometrically.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
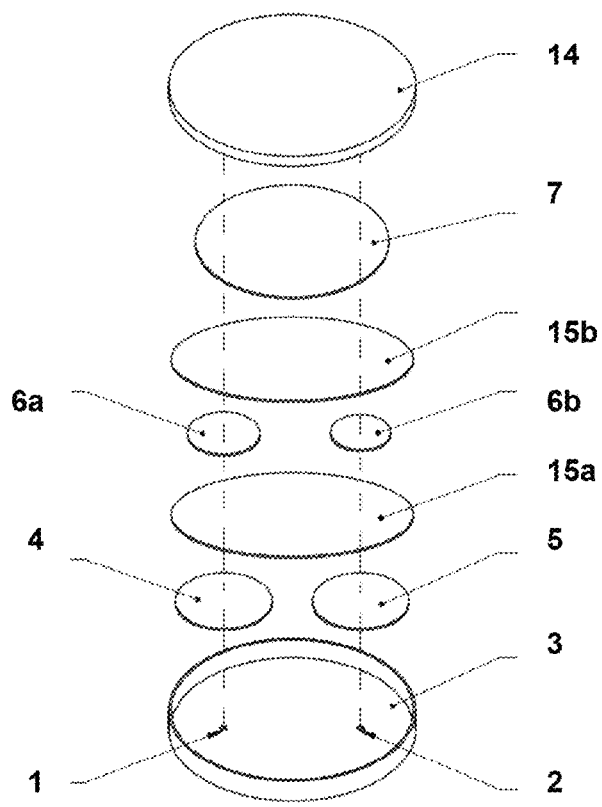
FIG. 1 is a schematic exploded view showing a configuration of a multi-gas sensor.

The electrode materials are comprised of or contain, e.g., platinum, iridium, palladium, rhodium, gold and/or carbon, e.g., in the form of platinum/carbon, carbon nanotubes, doped diamond or diamond-like carbon. The electrode materials preferably consist each of one substance/metal, i.e., they are uniform and are not, e.g., mixtures or alloys. In particular, the first electrode material consists of platinum or contains platinum. Typical representatives of the target gases are CO, $H_2S$, $O_2$, $SO_2$, $NO_2$, $NH_3$, HCN, $Cl_2$, HCl, HF, $CO_2$, $PH_3$, NO and others.

The target gas and/or gas is defined here as a molecule in the gaseous state, but it also comprises aerosols or vapors.

The electrolyte may be an inorganic aqueous acid, such as sulfuric acid, a salt solution containing, e.g., LiCl or LiBr or an ionic liquid. Ionic liquids are melts of salts, which are already liquid at temperatures below 100° C. Examples of cations used are alkylated imidazolium, pyridinium, ammonium or phosphonium ions. Typical anions are, e.g., halides, tetrafluoroborate, trifluoromethane sulfonimide, trifluoroacetate, trifluoromethane sulfonate, triflates, hexafluorophosphates, phosphinates and tosylates.

Multi-gas sensors for the selective measurement of different gases can be built by selecting the combination of electrolyte and electrode material. Examples of suitable combinations are listed in Table 1 below, wherein the electrode material of the working electrode and of the corresponding single electrode are identical:

TABLE 1

| | First electrode material | First target gas | Second electrode material | Second target gas | Electrolyte |
|---|---|---|---|---|---|
| (1) | Platinum | CO | Iridium | $H_2S$ | aqueous $H_2SO_4$ |
| (2) | Platinum | CO | Gold | $SO_2$ | aqueous $H_2SO_4$ |
| (3) | Iridium | $H_2S$ | Gold | $SO_2$ | aqueous $H_2SO_4$ |
| (5) | Platinum | CO | Gold | HCN | aqueous $H_2SO_4$ |
| (6) | Iridium | $H_2S$ | Gold | HCN | aqueous $H_2SO_4$ |
| (7) | Carbon | NO | Gold | $NO_2$ | aqueous $H_2SO_4$ |

The material of the counterelectrode is freely selectable. The counterelectrode is also in connection with the electrolyte.

At least one working electrode causes an unwanted (interference) signal according to one embodiment when, e.g., an alcohol, such as ethanol, reaches the reference electrode. The at least one working electrode, in this case the first working electrode, is the working electrode, having electrode material that causes the unwanted signal if the material is also used on the reference electrode.

The second working electrode is advantageously likewise arranged between the gas inlet, especially the second gas inlet, and the corresponding single electrode of the reference electrode, which has the second electrode material, even if this second electrode material does not elicit any unwanted signal.

The working electrodes and the reference electrode are preferably disk-shaped. The working electrodes and the reference electrode and/or the single electrodes, which form the reference electrode, may be configured, e.g., as thick-layer electrodes on a PTFE film, e.g., with a layer thickness/thickness of 50 μm to 400 μm and preferably 100 μm to 250 μm of the electrode material. In another embodiment, the electrode is made of a sputtered PTFE film, e.g., one with an electrode material layer thickness/thickness of 50 nm to 500 nm.

In one embodiment, the ratio of the mean thickness/thickness of the first single electrode to that of the second single electrode in the electrode material of the single electrodes may range from 1:1.5 to 1:2.5.

The two single electrodes of the reference electrode are separated from one another in space and are conductively connected to one another (connected in a conductive manner—electron conductor). This can be brought about by a conductor connecting the single electrodes electrically or else the single electrodes themselves are in contact with one another in an electrically conductive manner. For example, a web may be provided as a conductor, which connects the two single electrodes. The web and/or the conductor comprises an electron-conductive material and is insulated against the electrolyte according to one embodiment. This may be embodied, for example, in the form of a platinum wire having an insulating coating.

According to another embodiment, the electron-conductive web is formed from the first electrode material and from the second electrode material or from a mixture of two electrode materials. The reference electrode may have, e.g., the shape of a horizontal figure eight, of a dumbbell or of a bone. However, it is preferred for the single electrodes of the reference electrode to be connected to a conductor and for the single electrodes not to be otherwise in contact with one another and each single electrode may thus have a shape different from that of the other single electrode.

Single electrodes are preferably always disk-shaped. Single electrodes may be, e.g., plate-shaped, the plate preferably also always having the shape of a flat disk.

The effective area of the first single electrode of the reference electrode is especially smaller preferably by at least 15% and especially preferably by at least 30% relative to the corresponding first working electrode. Also independently from this, the area of the second single electrode of the reference electrode is smaller, preferably by at least 15% and especially preferably by at least 30% relative to the corresponding second working electrode.

The effective area is always calculated as a smooth surface geometrically, i.e., without taking into consideration, e.g., the roughness, and the effective area is the area of the electrode material of the respective electrode, which is in contact with the electrolyte.

In particular, the first single electrode and the first working electrode preferably have the same electrode material. According to one embodiment, the second single electrode and the second working electrode have now the same electrode material but they have different electrode materials compared to the first single electrode and to the first working electrode.

The reference electrode is positioned especially in the immediate vicinity of the working electrodes. The working electrode is preferably larger than the associated single electrode of the reference electrode and the working electrode is preferably also arranged such that, when viewed in the diffusion direction of the target gas entering through the gas inlet, it always shields the single electrode of the reference electrode that consists of the same electrode material, i.e., in other words, the working electrode is located as a kind of protective shield in front of the respective single electrode of the reference electrode in relation to the diffusion direction or on the lee side of the corresponding working electrode. Interfering gas entering with the target gas into the housing of the multi-gas sensor thus diffuses first/only to the working electrode. Thus, even though the interfering gas is also reacted electrochemically at the working electrode, so that there will be a brief display on the sensor due to this gas causing a cross sensitivity, the interfering gas cannot pass through farther up the reference electrode, at least not at a moderate concentration.

The working electrode, the single electrodes of the reference electrode and the counterelectrode are built up, in particular, in a stacked array of electrodes and respective electrolyte located between them. The electrodes have, in particular, a flat configuration and are each oriented plane-parallel in relation to one another.

The single electrodes are contacted with one another and form the reference electrode and are led to a reference electrode terminal. The potential becoming established is a mixed potential. Such a setting is not possible with an individual reference electrode, which has no single electrodes, with only one electrode material, not even if the electrode material is a mixture. The potential that becomes established can be set by the diameters of the electrodes and by the thickness of the electrode material layer. If, e.g., the weakest possible temperature effect is desired on the $H_2S$ side, the layer thickness and/or diameter of the $H_2S$ single electrode is increased. The layer thickness and the size of the individual reference electrodes have a positive influence on the dynamic temperature effect because the capacitive charge reversal currents can be minimized.

The gap between two electrodes may also be filled with nonwoven layers permeable to the electrolyte. This guarantees the steady and constant wetting of the active electrode areas with electrolyte and reduces the position sensitivity of the electrochemical multi-gas sensor.

The housing may also comprise at least two chambers separated in space, wherein the one pair of working electrode and single electrode is contained in one chamber and the other/second pair of working electrode and single electrode is contained in the other/second chamber.

The single electrodes are then connected to one another in an electrically conductive manner in this case as well. Identical or different electrolytes compositions and preferably different electrolyte compositions are contained in the chambers. A counterelectrode is contained in each chamber, and the counterelectrodes may be connected to one another in a conductive manner or the electrode material of the counterelectrode extends through the partition, preferably sealed against the passage of the electrolyte into both chambers. The chambers each have a gas inlet. The housing may be configured as a unit with two or more chambers or the chambers form respective separate units, so that the units can, e.g., be inserted one into another or held next to one another in another housing, but the chambers are at least connected to one another via the conductive connection of the single electrodes. An example would be a multi-gas sensor for CO, 1st chamber, working electrode and single electrode consisting of platinum, and $NH_3$, 2nd chamber, working electrode and single electrode consisting of iridium, with aqueous $H_2SO_4$ as the electrolyte in the first chamber and with aqueous LiCl as the electrolyte in the second chamber. Two different ionic liquids (electrolyte compositions) may likewise be used in the two chambers, e.g., for the target gas $H_2S$ (1-ethyl-3-methylimidazolium acetate, carbon-containing working electrode and single electrode) and for the target gas $SO_2$ (butylpyridinium chloride, carbon-containing working electrode and single electrode).

To achieve sufficient service lives and insensitivity to fluctuations in the ambient humidity and/or drying out, separate electrolyte volume chambers may be provided in the housing as storage spaces, with which the individual nonwoven layers are in contact via absorbent connections.

To secure the sensor against possibly occurring ambient pressure fluctuations, it may be advantageous if the sensor housing has a gas inlet for the entry of the gas to be measured, which gas inlet communicates with the environment of the sensor via a pneumatic damping element. Pressure fluctuations, which could lead to a damage to the sensor or to a temporary distortion of the measured signal, can be eliminated in this manner.

The electrodes and/or the readable devices for storing sensor-specific data are advantageously contacted in a sensor according to the present invention via contact pins, which can be inserted into the sensor housing and which are in fixed contact in the inserted state with conductive connection devices, which lead to the electrodes and/or readable devices for storing sensor-specific data and are electrically connected to these.

The multi-gas sensor is preferably equipped with a bipotentiostat. In this case the first electrode is the first working electrode of the bipotentiostat and the second electrode is the second working electrode of the bipotentiostat. The first and second working electrodes have a common reference electrode and a common counterelectrode, which are positioned such that the potentials of the first and second working electrodes can be controlled independently from one another.

FIG. 1 schematically shows the configuration of a multi-gas sensor. The sensor housing 3 encloses together with the cover 14 an electrolyte space for receiving an electrolyte 8, for example, sulfuric acid. The housing is provided with two gas inlets 1, 2, which are configured, e.g., in the form of a PTFE diffusion membrane. A first gas inlet 1, a first working electrode 4, a first single electrode 6a of the reference electrode and counterelectrode 7 are arranged in the housing in a first stacked array, and a second gas inlet 2, a second working electrode 5, a second single electrode 6b of the reference electrode and counterelectrode 7 are arranged each plane parallel to one another/one on top of another in a second stacked array.

The two single electrodes 6a, 6b and the working electrodes 4, 5 are arranged each centrally axially above the corresponding passage opening for the gas inlet 1, 2. The single electrodes 6a, 6b have each a smaller diameter than the diameter of the corresponding working electrode 4, 5. The first single electrode 6a and the second single electrode 6b of the reference electrode are connected in a conductive manner (shown in FIG. 2 only), so that a mixed potential is obtained.

A respective flat separator 15a, 15b, e.g., in the form of a flat glass nonwoven, is present between the electrodes. The separator 15a is arranged plane-parallel to the two working electrodes 4, 5 and creates a distance at the same time between the first working electrode and the first single electrode 6a of the reference electrode, on the one hand, and between the second working electrode 5 and the second single electrode 6b of the reference electrode 6, on the other hand. The separator 15b also has a flat configuration, e.g., in the form of a flat glass nonwoven, and the separator 15b creates a distance between the single electrodes 6a, 6b of the reference electrode 6 and the counterelectrode 7.

Figure 2:
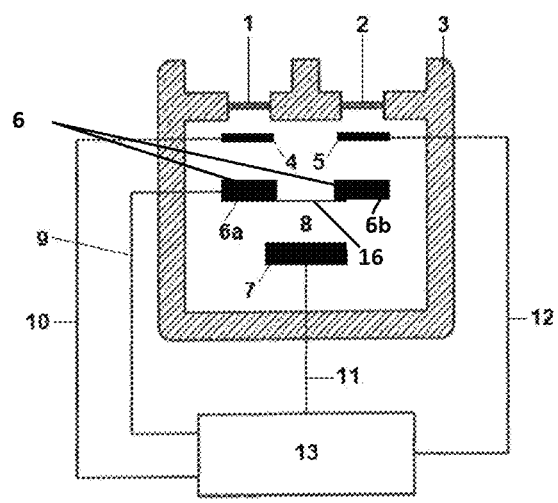
FIG. 2 is a schematic view showing a connection of electrodes.

FIG. 2 shows the connection of the electrodes. The working electrodes 4, 5 are connected each separately from one another to a potentiostat 13 via the terminal 10 of the first working electrode and the terminal 12 of the second working electrode. The first single electrode 6a of the reference electrode 6 is short-circuited with the second single electrode 6b of the reference electrode 6 via a conductor 16. The effective area of the electrode material of the first single electrode 6a is markedly smaller than the effective area of the electrode material of the corresponding first working electrode 4. This is also true of the effective area of the electrode material of the second single electrode 6b relative to the effective area of the electrode material of the corresponding second working electrode 5. The counterelectrode 7, which is likewise connected to the potentiostat 13 via terminal 11, just as the first single electrode 6a and the second single electrode 6b of the reference electrode 6 are connected together via the terminal 9, is located under the reference electrode 6. The separators 15a, 15b are not shown in FIG. 2. The arrangement of the electrodes is the same as in FIG. 1, aside from the fact that the counterelectrode 7 is smaller. The potentiostat is configured as a bipotentiostat.

Figure 3:
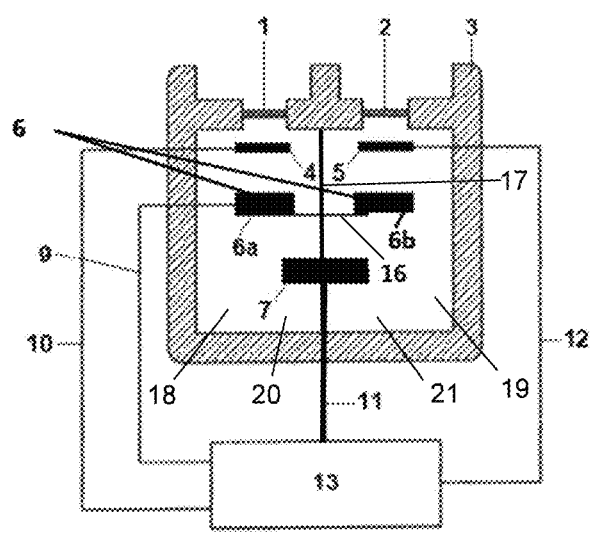
FIG. 3 is a schematic view showing a connection of electrodes according to an alternative embodiment.

FIG. 3 shows the alternative embodiment with the housing 3 comprising at least two chambers, namely a first chamber 18 and a second chamber 19, separated in space by a partition 17. The working electrode 4 and single electrode 6a is contained in one chamber 18 and the other working electrode 5 and single electrode 6b is contained in the other/second chamber 19. The counterelectrode 7 is contained in each of the first chamber 18 and the second chamber 19. The counterelectrode 7 extends through the partition 17 and is sealed against the passage of the electrolyte into both chambers 18, 19. The chambers each have a gas inlet 1, 2 respectively. Two different ionic liquids 20, 21 (electrolyte compositions) are used in the two chambers 18, 19.

While specific embodiments of the invention have been shown and described in detail to illustrate the application of the principles of the invention, it will be understood that the invention may be embodied otherwise without departing from such principles.

LIST OF REFERENCE NUMBERS

1 First gas inlet
2 Second gas inlet
3 Housing
4 First working electrode
5 Second working electrode
6 Reference electrode
6a First single electrode
6b Second single electrode
7 Counterelectrode
8 Electrolyte
9 Terminal for reference electrode
11 Terminal for counterelectrode
12 Terminal for second working electrode
15b Second separator
16 Conductor
17 Partition
18 $1^{st}$ Chamber
19 $2^{nd}$ Chamber
20 $1^{st}$ electrolyte
21 $2^{nd}$ electrolyte

What is claimed is:

1. A multi-gas sensor comprising:
a housing comprising a gas inlet;
a first working electrode comprised of a first electrode material;
a second working electrode comprised of a second electrode material, wherein the second electrode material is different from the first electrode material;
a reference electrode comprising a first single electrode comprised of the first electrode material and, separately therefrom, a second single electrode comprised of the second electrode material, the first single electrode and the second single electrode being electrically conductively connected; and
an electrolyte in an interior of the housing, wherein the electrolyte is in contact with the first electrode material of the first working electrode, with the second electrode material of the second working electrode, with the first electrode material of the first single electrode of the reference electrode and with the second electrode material of the second single electrode of the reference electrode, wherein the first working electrode is arranged between the gas inlet and the first single electrode of the reference electrode.

2. The multi-gas sensor in accordance with claim 1, wherein the second working electrode is arranged between the gas inlet and the second single electrode of the reference electrode.

3. The multi-gas sensor in accordance with claim 1, wherein the first electrode material and the second electrode material are selected, each separately from the other, from among palladium, iridium, carbon, platinum and rhodium.

4. The multi-gas sensor in accordance with claim 1, wherein the first working electrode, the second working electrode and the first single electrode and the second single electrode of the reference electrode have each a disk shape.

5. The multi-gas sensor in accordance with claim 1, wherein:
the gas inlet is a first gas inlet and the housing further comprises a second gas inlet;
the first working electrode is arranged between the first gas inlet and the first single electrode of the reference electrode, which has the first electrode material; and
the second working electrode is arranged between the second gas inlet and the second single electrode of the reference electrode, which has the second electrode material.

6. The multi-gas sensor in accordance with claim 5, wherein:
the first gas inlet, the first working electrode and the first single electrode are arranged one on top of another and form a first stacked array; and
the second gas inlet, the second working electrode and the second single electrode are arranged one on top of another and form a second stacked array.

7. The multi-gas sensor in accordance with claim 6, further comprising a counterelectrode that is a part of both the first stacked array and the second stacked array, the first working electrode and the first single electrode being arranged one on top of another and form the first stacked array, the second working electrode and the second single electrode being arranged one on top of another and form the second stacked array, wherein the counterelectrode forms a closure of the first stacked array and the second stacked array.

8. The multi-gas sensor in accordance with claim 5, wherein:
the first working electrode has a larger effective area with the first electrode material than does the first single electrode; and
the first working electrode covers the first single electrode when viewed from the first gas inlet.

9. The multi-gas sensor in accordance with claim 5, wherein:
the second working electrode has a larger effective area with the second electrode material than does the second single electrode; and
the second working electrode covers the second single electrode when viewed from the second gas inlet.

10. The multi-gas sensor in accordance with claim 5, wherein:
the housing comprises at least a first chamber and a second chamber defining separated spaces;
the first gas inlet, the first working electrode and the first single electrode are functionally connected to or are in the first chamber; and
the second gas inlet, the second working electrode and the second single electrode are functionally connected to or are in the second chamber.

11. A multi-gas sensor in accordance with claim 5, wherein:
the electrolyte comprises a first electrolyte composition and a second electrolyte composition, wherein the second electrolyte composition is different from the first electrolyte composition;
the housing comprises at least a first chamber and a second chamber defining separated spaces;
the first electrolyte composition, the first gas inlet, the first working electrode and the first single electrode are functionally connected to or are in the first chamber; and
the second electrolyte composition, the second gas inlet, the second working electrode and the second single electrode are functionally connected to or are in the second chamber.

12. The multi-gas sensor in accordance with claim 1, wherein the first working electrode has a larger effective area with the first electrode material than does the first single electrode.

13. The multi-gas sensor in accordance with claim 1, wherein the second working electrode has a larger effective area with the second electrode material than does the second single electrode.

14. The multi-gas sensor in accordance with claim 1, further comprising a conductor wherein the first single electrode and the second single electrode are connected electrically by the conductor.

15. The multi-gas sensor in accordance with claim 14, wherein the conductor is insulated against the electrolyte to provide an insulated conductor and the conductor is comprised of platinum, wherein the insulated conductor is located in the electrolyte.

16. The multi-gas sensor in accordance with claim 1, wherein the first electrode material and the second electrode material of the first single electrode and the second single electrode have a mean thickness of 50 µm to 400 µm.

17. The multi-gas sensor in accordance with claim 1, wherein the first electrode material and the second electrode material of the first single electrode and the second single electrode have a mean thickness of 100 µm to 250 µm.

18. The multi-gas sensor in accordance with claim 1, wherein:
an effective area of the first single electrode is smaller by at least 15% relative to the first working electrode; and
an effective area of the second single electrode is smaller by at least 15% relative to the second working electrode.

19. The multi-gas sensor in accordance with claim 1, wherein:
an effective area of the first single electrode is smaller by at least 30% relative to the first working electrode; and
an effective area of the second single electrode is smaller by at least 30% relative to the second working electrode.

20. The multi-gas sensor in accordance with claim 1, further comprising a bipotentiostat connected to the first working electrode, the second working electrode and the reference electrode.

21. A process for the quantitative or qualitative determination of two target gases simultaneously in the presence of one another, the process comprising the steps of:
providing a multi-gas sensor comprising:
a housing comprising a gas inlet;

a first working electrode comprised of a first electrode material;

a second working electrode comprised of a second electrode material, wherein the second electrode material is different from the first electrode material;

a reference electrode comprising a first single electrode comprised of the first electrode material and, separately therefrom, a second single electrode comprised of the second electrode material, the first single electrode and the second single electrode being electrically conductively connected; and an electrolyte in an interior of the housing, wherein the electrolyte is in contact with the first electrode material of the first working electrode, with the second electrode material of the second working electrode, with the first electrode material of the first single electrode of the reference electrode and with the second electrode material of the second single electrode of the reference electrode, wherein the first working electrode is arranged between the gas inlet and the first single electrode of the reference electrode; and determining quantitatively or qualitatively, with the multi-gas sensor, the two target gases simultaneously.

22. The process in accordance with claim 21, further comprising:

a counterelectrode, the first working electrode and the first single electrode being arranged one on top of another and form a first stacked array, the second working electrode and the second single electrode being arranged one on top of another and form a second stacked array, wherein the counterelectrode is a part of both the first stacked array and the second stacked array, wherein the two target gases are $H_2S$ and CO.

* * * * *